United States Patent [19]

Palonen

[11] Patent Number: 4,983,991
[45] Date of Patent: Jan. 8, 1991

[54] METHOD AND APPARATUS FOR MARKING A FILM IN AN X-RAY APPARATUS

[75] Inventor: Juhani Palonen, Espoo, Finland

[73] Assignee: Instrumentarium Corp., Finland

[21] Appl. No.: 471,911

[22] Filed: Jan. 29, 1990

[30] Foreign Application Priority Data

Nov. 14, 1989 [FI] Finland .................................. 895411

[51] Int. Cl.[5] .......................... G01D 9/00; G03C 1/76; G03B 27/52
[52] U.S. Cl. ......................... 346/33 ME; 346/76 PH; 346/1.1; 346/49; 346/50; 346/51; 346/78; 346/94; 355/40; 355/77; 352/236
[58] Field of Search ................ 346/33 ME, 49, 50, 51, 346/78, 94, 76 PH, 1.1; 355/40, 77; 352/236

[56] References Cited

U.S. PATENT DOCUMENTS 4,553,833 11/1985 Kanaoka et al. ...................... 355/40

FOREIGN PATENT DOCUMENTS 2749721 5/1979 Fed. Rep. of Germany ........ 355/40

*Primary Examiner*—Bruce A. Reynolds
*Assistant Examiner*—Huan Tran

*Attorney, Agent, or Firm*—Andrus, Sceales, Starke & Sawall

[57] ABSTRACT

The inventon relates to a method and apparatus for marking or recording patient-related information and other necessary data in connection with X-ray imaging on a certain section of a film (6) by using a marking apparatus (2) which is movable relative to film (6). In the method, markings are made latent on film (6) in a manner that the markings become visible in connection with film development. The marking is effected as a sequence, line-directed deviation of a marking being obtained by moving the marking apparatus and the film relative to each other. The marking apparatus (2) used in the method is provided with marking elements which are brought into contact with film (6) for producing a marking on film (6), vertical deviation of alphanumerical marks included in a marking being achieved by individually controlling the operation of each marking element included in the marking apparatus. The marking apparatus of the invention includes marking elements and actuators for bringing the marking elements into contact with film (6) for marking the film. The apparatus further includes carrier assembly (8-10) for moving a marking apparatus (2) in the longitudinal direction of a slot (3) made in a film cassette (1).

11 Claims, 2 Drawing Sheets

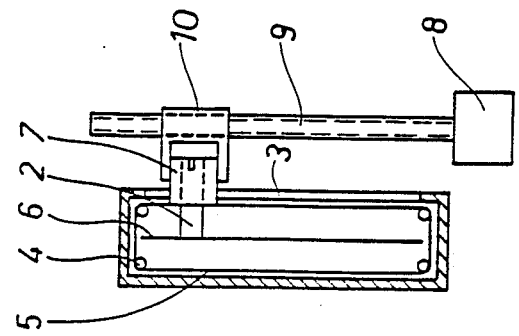
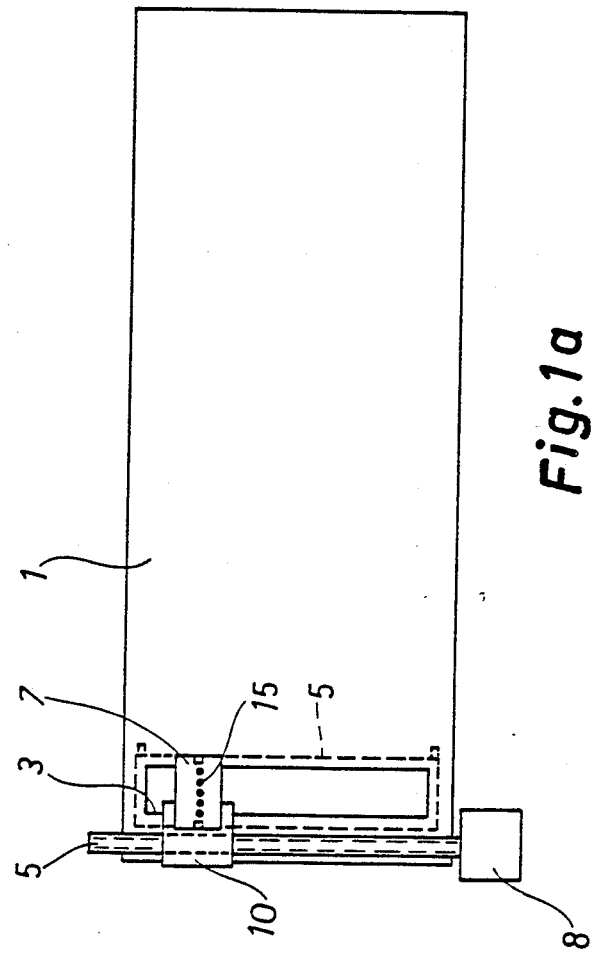
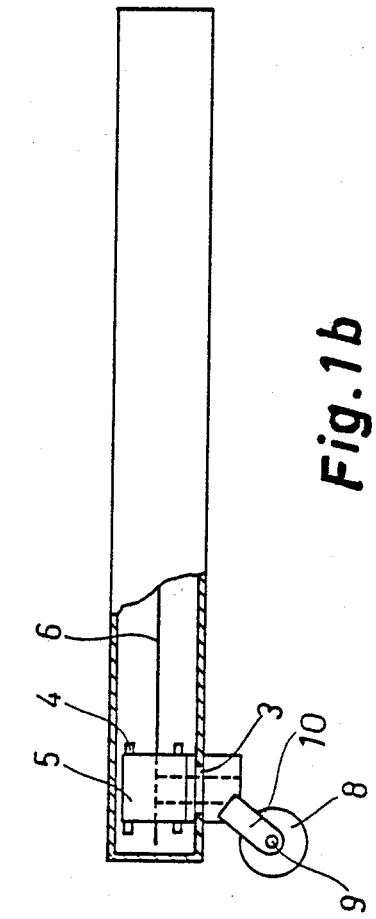
Fig. 1c
Fig. 1a
Fig. 1b

U.S. Patent   Jan. 8, 1991   Sheet 2 of 2   4,983,991
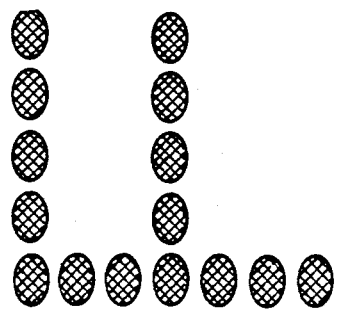
Fig. 3
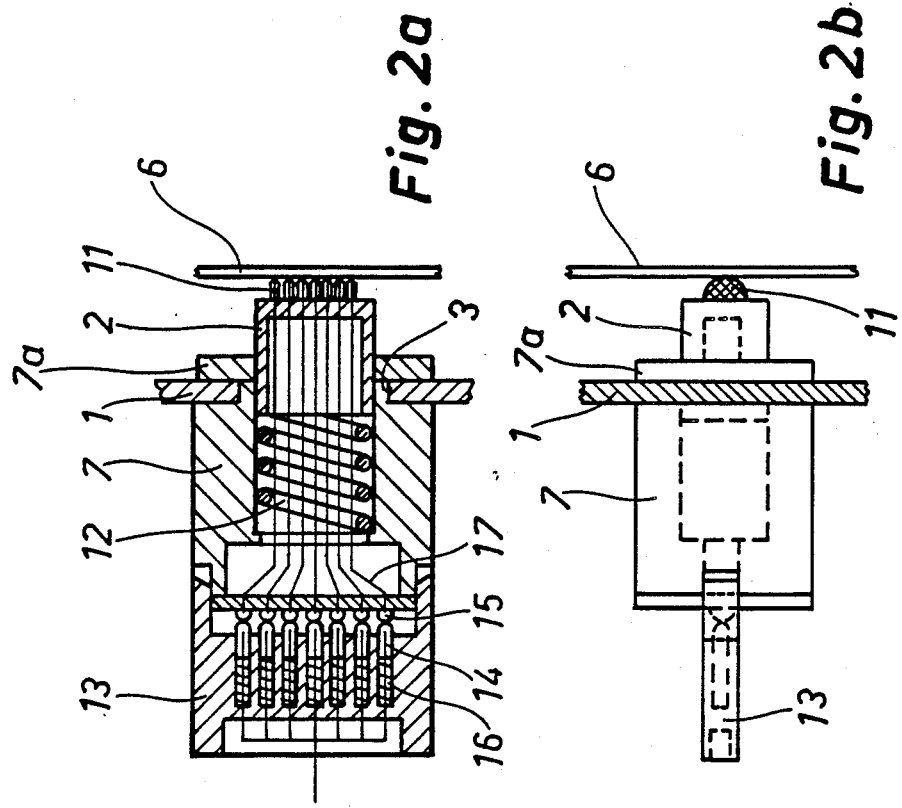
Fig. 2a
Fig. 2b

METHOD AND APPARATUS FOR MARKING A FILM IN AN X-RAY APPARATUS

The present invention relates to an X-ray film marking method as well as to an apparatus for marking an X-ray film.

BACKGROUND OF THE INVENTION

Usually the marking of information to be recorded on film, such as the identity information of a patient as well as necessary information relating to diagnosis, imaging process and filing, is performed manually or by using a separate device particularly designed for the purpose. When the markings are performed manually, the procedure may be e.g. such that the necessary information is written on an adhesive tape which is glued to the film after imaging. The markings can also be made in a manner that to the surface of a film cassette is glued a lead tape on which is written the information needed for X-ray imaging. Thus, the text written on a lead tape is projected on an X-ray film during the imaging process and becomes visible during the film development. A problem with these prior known manual marking methods is that they take a lot of time and they also involve a relatively high risk of error.

When using a prior known separate marking device, the information is first written on a piece of paper and the text is projected on a photographed, still non-developed X-ray film by means of a photoprojector included in the device. The latent marking information on the film can be made visible during development of the film. Such marking device is placed in a darkroom in connection with developing equipment which leads to a risk of marking information getting mixed up since the writing and marking of information take place in different locations.

SUMMARY OF THE INVENTION

An object of the present invention is to provide such a method and apparatus for marking the patient information and other necessary information in X-ray imaging on a certain section of a film in a manner that the drawbacks of the above marking methods can be substantially eliminated. In order to achieve this object, a method of the invention is characterized in that the marking apparatus is provided with marking means which are brought into contact with a film for producing a marking on the film, the vertical deviation of alphanumerical marks in a marking being achieved by controlling individually the operation of each marking means included in the marking apparatus.

An apparatus of the invention is characterized in that a marking unit is provided with marking means and with means for bringing the marking means into contact with a film for marking the film, and that the apparatus is further provided with carrier means for moving the marking unit in the longitudinal direction of the cassette opening.

The advantages gained by a marking method and apparatus of the present invention include e.g. the fact that the marking can be made in connection with imaging, e.g. immediately after the imaging. Another advantage is a relatively simple construction and the fact that the apparatus and method are applicable both to dental imaging equipment, wherein a film travels during the imaging relative to X-rays, and to normal radioscopy equipment, wherein a film remains stationary during the imaging.

DESCRIPTION OF THE DRAWINGS

The invention will now be described with reference made to the accompanying drawings, in which:

FIGS. 1a–1c show a film cassette fitted with a marking device of the invention in front, plan and end view, respectively, FIG. 2a is a more detailed sectional view of a marking apparatus of the invention, FIG. 2b shows the marking apparatus of FIG. 2a in a side view, and FIG. 3 shows a marking produced by means of a marking apparatus of the invention.

DESCRIPTION OF THE PREFERRED EMBODIMENT

As shown in FIGS. 1a–1c, a marking apparatus of the invention comprises a slide member 7 which is fitted with a marking unit 2, e.g. a thermal writing head. The slide member 7 is adapted to travel in an elongated slot 3 formed in a film cassette 1, said movement being effected by means of a screw 9 driven by a motor 8 and by means of a forked nut 10 secured to screw 9, said forked nut 10 being attached to slide member 7. Slide member 7 is further provided with a shutter 5 for blocking the passage of light onto the film surface through slot 3. Shutter 5 is preferably adapted to circle around rollers 4 inside film cassette 1. According to FIGS. 2a–2b, the slide member 7 is preferably fitted in slot 3 by means of a separate flange portion 7a, fitted inside cassette 1 and fastened to slide member 7 e.g. with screws, snap joints etc. The thermal writing head 2 serving as a marking unit is provided with heat sources 11 which can be brought into contact with a film 6 e.g. by means of a spring 12 applying pressure on thermal writing head 2. The heating provided by heat sources 11 can be achieved e.g. by using a separate conductor piece 13 which is fitted with contact pins 14 and spring means 16 attached thereto. With conductor piece 13 fixed in position on slide member 7, said spring means 16 can be used for bringing contact pins 14 into contact with a corresponding contact pin 15 mounted on slide member 7. Furthermore, the contact pins 15 are each provided with their own conductors for connecting them to a corresponding heat source 11. The separate heating from each heat source 11 can be effected e.g. in a manner that each contact pin 14 is separately controlled into and out of contact with the corresponding contact pin 15. Heating can also be provided in a manner that each contact pin 14 is in a continuous contact with a corresponding contact pin 15, each conductor 17 being fitted with a separate on-off coupling for controlling the current input to each heat source 11. The control can also be provided in a manner that each contact pin 14 is connected to a source of power (not shown) by its own supply line, whereby the on-off couplings for current input can be located at the actual source of current. Naturally, such circuitry can be set up by using several other alternatives which are obvious to a person skilled in the art.

As an alternative, the marking unit 2 can be a mechanical device provided e.g. with punching means for punching an X-ray film to provide desired marks by perforation. In this case, each punching means is provided with a separate control means for transferring it in a direction perpendicular to X-ray film 6.

The timing of marking means in a marking unit and the control of the vertical and horizontal deviations of marks is preferably effected by means of a microcomputer. The input of patient-related information can be effected e.g. by using an external printer.

In a method of the invention, the patient-related information and other necessary data are stored in the memory of a micro-computer e.g. by means of an external printer, whereafter the marking of a film can be effected under the control of a micro-computer e.g. immediately after the imaging whereby the parameters used in imaging can also be readily recorded on the film, if necessary. The marks can be formed e.g. as a 5×7 size matrix like the letter F shown in FIG. 3. The marking deviation extending in the same direction as the text has been accomplished by means of motor 8 and a screw-forked nut assembly 9, 10 driven thereby and the vertical deviation of the mark by a suitable on-off control of the marking means.

I claim:

1. A method for recording patient related information and other data in connection with X-ray imaging, comprising the steps of mounting an X-ray film in a cassette having an elongated slot, inserting marking means having a plurality of marking elements through the slot and into contact with said film, moving the marking means and the film relative to each other, individually effecting operation of said marking elements to provide a pattern of marks on said film, and blocking the passage of light through said slot into the cassette and onto the film.

2. The method of claim 1, wherein the step of individually effecting operation of said marking elements comprises connecting a heat source to each marking element, and individually actuating each heat source to effect marking by the corresponding marking element.

3. The method of claim 1, wherein the step of individually effecting operation of said marking elements comprises operating a mechanical punch to mark the film by perforation.

4. An apparatus for recording patient related information and other data in connection with X-ray imaging, comprising a cassette to contain an X-ray film and having an elongated slot, a slide extending through said slot, marking means carried by the slide, drive means for effecting relative movement between the slide and the cassette to move the marking means relative to said film, means for bringing said marking means into contact with the film for marking said film, and means for blocking passage of light through the slot onto the film.

5. The apparatus of claim 4, wherein said marking means comprises a plurality of marking elements, said apparatus includes heating means operably connected to each marking element for individually heating each marking element to effect marking of the film.

6. The apparatus of claim 5, and including resilient means operably connected to each marking element for urging the marking element into contact with said film.

7. The apparatus of claim 5, wherein said heating means comprises a plurality of first contacts each connected to a marking element, a plurality of second contacts each engaged with a first contact, and a source of electrical current connected to said second contacts.

8. The apparatus of claim 7, and including means for urging the first and second contacts into engagement with each other.

9. The apparatus of claim 4, wherein said marking means comprises mechanical punch means for marking the film by perforation.

10. The apparatus of claim 4, wherein said slide is mounted for movement relative to said cassette, said drive means comprising a motor, a screw operably connected to the motor and disposed to rotate in accordance with operation of said motor, a nut engaged with the screw nd disposed to travel in the axial direction of the screw in accordance with rotation of said screw, said slide being connected to said nut.

11. The apparatus of claim 4, wherein said slot extends transversely to the longitudinal direction of said cassette.

* * * * *